Patented Dec. 31, 1935

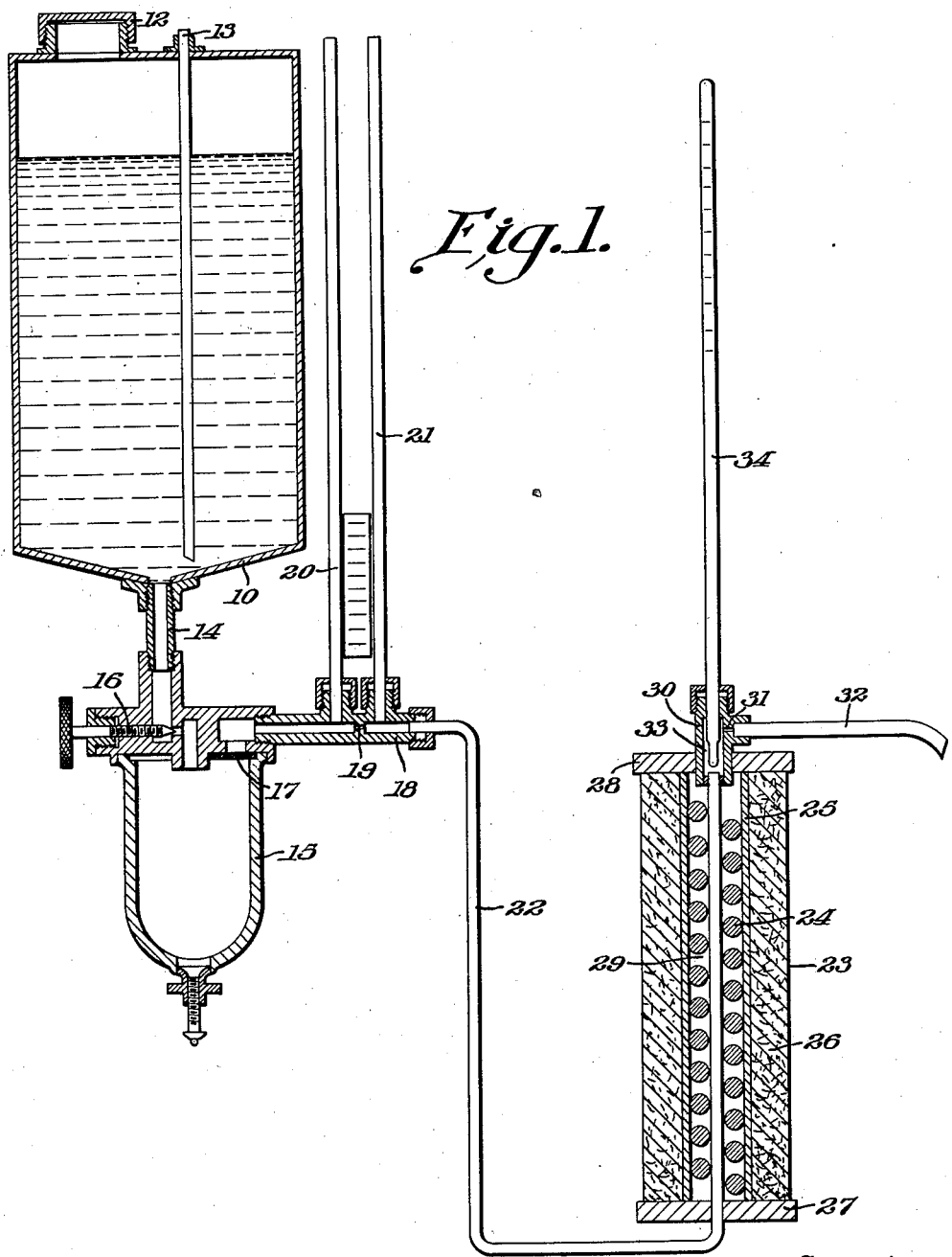

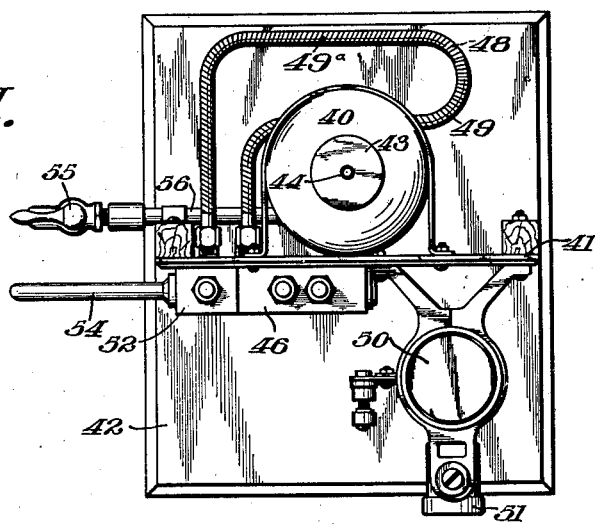
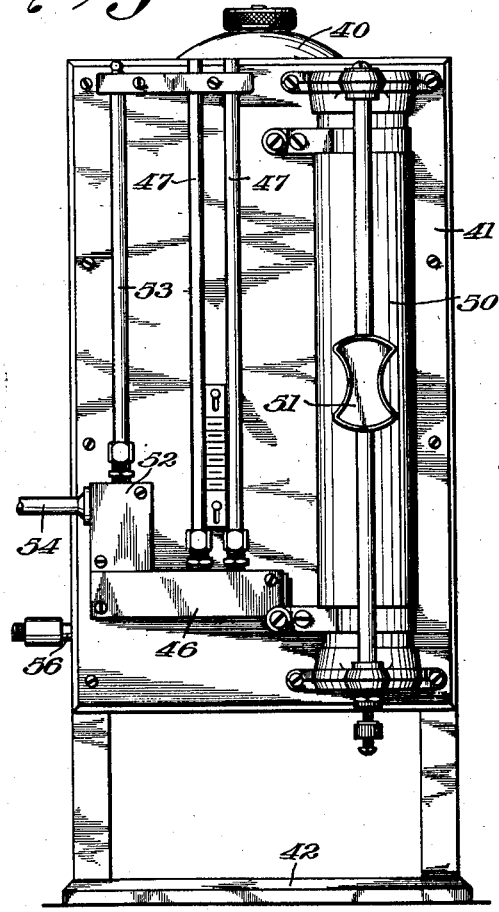
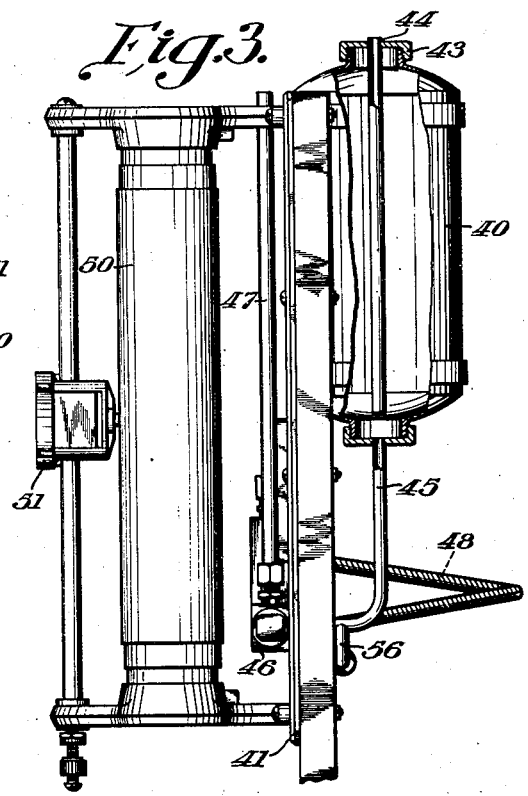

2,026,137

UNITED STATES PATENT OFFICE 2,026,137

APPARATUS FOR TESTING VAPOR-LOCK

Wendell A. Moor, Long Beach, Calif., assignor to The Texas Company, New York, N. Y., a corporation of Delaware Application November 26, 1932, Serial No. 644,508

2 Claims. (Cl. 73—51)

My invention relates to the testing of fuels and more particularly to an apparatus for determining the temperature of a liquid fuel necessary to cause vapor-lock.

As is well known, when the carburetor or fuel line of an internal combustion engine is subjected to a temperature sufficiently high, the phenomenon of vapor-lock or gas-lock takes place, this being caused by the formation of bubbles of vapor or gas in the liquid passages, these bubbles reducing the weight of fuel passing through the orifice of the carburetor by such an amount that the motor misses or ceases running due to the excessive leanness of the fuel mixture. The principal object of the apparatus which I have devised is to measure the temperature to which it is necessary to heat the liquid fuel in order to cause vapor-lock. The knowledge of this temperature enables one to predict the performance of any sample of fuel when used in actual operation in an internal combustion engine.

Previously the vapor-lock temperature has been measured by inserting a thermocouple in the passage to the jet of a carburetor attached to an engine, raising the temperature of the air being supplied to the carburetor, and noting the temperature of the fuel when the power developed by the engine suddenly falls off. This entails the use of an expensive and cumbersome apparatus while that which I have invented has but few parts, is portable and inexpensive.

In carrying out my invention, I have provided a reservoir for supplying liquid fuel to be tested, at a constant pressure, and means for heating the fuel as it flows from the reservoir. In the fuel line between the reservoir and the heater is a device for measuring the rate of flow of the fuel and at the end of the fuel line in proximity to the heater is located an orifice through which the fuel passes after it has been heated. Means are provided for indicating the temperature of the fuel as it passes through the orifice and, by noting the temperature prevailing when the fuel has been heated to a degree such that it will not pass freely through the orifice, an exact determination may be made of the vapor-locking tendencies of the fuel being tested.

For a better understanding of my invention, reference may be had to the accompanying drawings in which Fig. 1 is a somewhat diagrammatic sectional elevation of one form of apparatus embodying the invention while Figs. 2, 3, and 4 are respectively a front elevation, a side elevation with parts broken away, and a plan view of a slightly different embodiment of the invention.

Referring to Fig. 1 of the drawings, I have provided a suitable receptacle or reservoir 10 for the fuel to be tested, the reservoir being provided with an air-tight filling cap 12 and an air inlet tube 13 extending to a point near the bottom of the reservoir. An outlet pipe 14 extends downwardly from the bottom of the reservoir 10 and preferably connects with a suitable trap 15 containing a valve 16 and a cleaning screen 17. The effect of this arrangement, when the screw cap 12 is closed, is to cause the pressure at the outlet 14 of the tank to become constant when the contents are allowed to flow out, the constant pressure being equal to that obtained when the tank is filled only to the level of the bottom of the tube 13, with the tank open to the air. This follows from the fact that the reduction of pressure in the upper portion of the reservoir 10 is measured by and is equal to the difference between the height of the liquid in the reservoir and the bottom of the tube 13. After the flow has started through the tube 14 a vacuum will be formed in the upper portion of the reservoir 10 and the pressure therein will drop until the liquid has been drawn downwardly and out of the tube 13. Air will then pass out of the tube 13 to partially offset the vacuum in the upper portion of the chamber. As the liquid level in the chamber continues to lower the vacuum above the liquid will be automatically maintained sufficient to balance that weight of the liquid in the chamber above the lower end of the tube 13. Thus, as the level in the reservoir 10 drops, the reduction in pressure in the upper portion of the chamber drops in exact proportion, the pressure or head on the liquid in the outlet 14 remaining substantially constant for any head of liquid in the reservoir 10. The rate of flow of fuel through the apparatus is thus maintained constant.

Leading from the trap 15 is an orifice member 18 having an orifice 19 and provided at either side of the orifice 19 with manometers or flow tubes 20 and 21. A tube 22 leading from the orifice member 18 extends to and through a heating device 23. The heater 23 is preferably of an electrical type and comprises a coiled heating element 24 surrounding a portion of the tube 22 and surrounded in turn by a refractory tube or cylinder 25. Suitable heat insulating material 26 surrounds the tube 25 and a pair of end members 27 and 28 serve to close the heating chamber 29.

Mounted in the upper end member 28 of the heater 23 is an orifice block 30 provided with an orifice 31. A tube 32 preferably leads from the orifice to any suitable receptacle for collecting the tested fuel. The orifice block 30 is provided with a chamber 33 arranged to connect with the end of the fuel tube 22. A thermometer 34 is mounted in the orifice member 30 with its lower end extending into the chamber 33.

In operation, the sample of fuel is placed in the reservoir 10 and the cap 12 closed. As the fuel runs out through the outlet 14, the pressure soon drops to the constant value. The differential reading of the manometer or flow tubes 20, 21 will indicate the head on the orifice 19 and this head should remain substantially constant. After sufficient fuel has passed through the orifice 19 to fill the tube 22, heat is applied by means of the heater 23 and the temperature is raised gradually and uniformly while the flow rate is observed by means of the manometers 20 and 21. This rate will remain substantially constant until bubbles of vapor or gas are formed in the orifice chamber 33, which bubbles will retard the flow of the fuel through the orifice 31 and the rate of flow through orifice 19 will then drop in proportion to the volume of vapor formed and also will become slightly irregular. The temperature at which the rate of flow begins to diminish rapidly is the vapor-lock temperature of the fuel and this may be read directly from the thermometer 34.

In Figs. 2, 3, and 4 I have illustrated my invention in a slightly different arrangement, the principles of operation however being substantially the same as those previously described with reference to Fig. 1. As is the case with respect to the apparatus illustrated in Fig. 1, the testing device shown in the remaining figures consists essentially of a reservoir, a flow meter, a heater tube, a thermometer and an orifice block.

The fuel reservoir 40 is secured to one side of a suitable upright panel 41 mounted upon a base 42. As shown more clearly in Fig. 3, the reservoir 40 is provided with a threaded cap or closure member 43 and an air tube 44 open at its upper end and extending downwardly to a point slightly above the bottom of the reservoir. As has been explained with reference to Fig. 1, this arrangement is such as to cause the fuel leaving the reservoir through the outlet tube 45 to be maintained at a constant pressure. The outlet tube 45 is connected through the back of the panel 41 to a flow meter block 46 mounted on the front of the panel. A pair of manometer or flow tubes 47 are connected to the flow meter block 46 and within the block 46 and between the tubes 47 is mounted an orifice (not shown) corresponding to the orifice 19 of Fig. 1. A heating tube 48 is mounted at the rear of the panel 41 and is connected at one end through the panel to the flow meter block 46. As will be observed with reference to Fig. 3, the heating tube 48 is mounted so as to rise gradually and uniformly throughout its length for a purpose which will be explained hereinafter. The heating tube 48 is preferably constructed of copper with an external winding of resistance wire 49 separated from the tube by means of a layer of insulating material such as mica tape 49a. The heat produced in the wire 49 is controlled by means of a rheostat 50 provided with an adjustable slider 51 adapted to form an electrical contact with the resistance of the rheostat. The rheostat 50 may be of any suitable type but preferably comprises a layer of resistance wire more or less of which may be connected in series with the heating wire 49 by means of the adjustable slider 51. Since the electrical connections do not form a part of my invention they have not been illustrated in the drawings.

The resistance wire 49 being wound directly on the mica tape 49a in close proximity to the heater tube 48 permits of rapid cooling between runs and more accurate control of the temperature of the fuel passing through the heating tube.

The upper end of the heater tube 48 is connected through the rear of the panel 41 to a thermometer block 52 mounted on the front of the panel. The block 52 contains an orifice and a chamber similar respectively to the orifice 31 and chamber 33 shown in Fig. 1, and the lower end of the thermometer 53 projects into the chamber near the orifice as is the case with the thermometer 34 of Fig. 1. The chamber within the block 52 is connected by means of a tube 54 to any convenient receptacle, and a drain cock 55 (Fig. 4) is connected by means of a tube 56 to the outlet tube 45 of the reservoir 40, as shown more clearly in Fig. 3.

In the operation of this embodiment of the invention, as the fuel leaves the reservoir 40 through the tube 45, the pressure in the latter tube soon drops to a constant value. Heat is then gradually and uniformly applied to the heating tube 48 by means of the electrical heater surrounding that tube so that the temperature therein rises slowly. The flow rate, as indicated by the differential in the manometer tubes 47, will remain substantially constant as the temperature rises until vapor bubbles begin to form in the heater tube 48. The rate of flow then drops in proportion to the volume of vapor formed and also becomes somewhat irregular. The temperature as indicated by the thermometer 53 at which the rate of flow begins to diminish rapidly may be considered the vapor-lock temperature of the fuel being tested. Since the heater tube 48 slopes upward, bubbles of vapor will not tend to collect therein but will pass on with the liquid flowing through the tube.

Obviously many modifications and variations of the invention, as hereinbefore set forth, may be made without departing from the spirit and scope thereof, and therefore only such limitations should be imposed as are indicated in the appended claims.

I claim:

1. In apparatus for determining the temperature necessary to cause vapor-lock in a liquid fuel feed system, a fuel reservoir provided with an outlet tube, means associated with said reservoir for normally maintaining substantially constant pressure of the fuel in said outlet tube, means for indicating the rate of flow of fuel through said tube, means for heating the fuel as it passes through a portion of said tube, the heated portion of said tube being mounted so as to slope gradually upward, said heating means comprising an electrical resistance element wound around and in close contact with said portion of said tube, means for controlling the amount of heat applied to said fuel by said heating means, an orifice through which said fuel passes after being heated, and means for indicating the temperature of the fuel as it passes through said orifice.

2. In apparatus for determining the temperature necessary to cause vapor-lock in a liquid fuel feed system, a fuel reservoir having a normally closed upper end and an outlet at its lower end, a conduit connected at one end to said outlet for conducting fuel from said reservoir, means associated with said reservoir for normally maintaining constant pressure in the fuel as it flows through said conduit, said constant pressure means comprising an air tube open to the atmosphere at its upper end and depending within said reservoir to a point above said outlet, said conduit being provided with an orifice, manometer tubes connected to said conduit at opposite sides of said orifice to indicate the rate of flow through said conduit, the other end of said conduit being provided with a second orifice and the portion of said conduit between said orifices sloping gradually upward, an electric heater enclosing said sloping portion of said conduit, and temperature indicating means connected to said conduit in close proximity to said second orifice.

WENDELL A. MOOR.